(12) United States Patent
Ogino

(10) Patent No.: US 6,833,858 B1
(45) Date of Patent: Dec. 21, 2004

(54) IMAGE INPUT APPARATUS

(75) Inventor: Shigeru Ogino, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/406,479

(22) Filed: Sep. 27, 1999

(30) Foreign Application Priority Data

Oct. 2, 1998 (JP) .................................... HEI 10-281298

(51) Int. Cl.⁷ ............................................... H04N 7/18
(52) U.S. Cl. ........................................ 348/46; 348/43
(58) Field of Search ..................................... 348/42–60

(56) References Cited

U.S. PATENT DOCUMENTS 5,699,444 A * 12/1997 Palm ........................... 382/106
5,864,360 A * 1/1999 Okauchi et al. ............... 348/47
6,111,597 A * 8/2000 Tabata .......................... 348/43
6,191,809 B1 * 2/2001 Hori et al. ..................... 348/45

* cited by examiner

Primary Examiner—Andy Rao
(74) Attorney, Agent, or Firm—Cowan, Liebowitz & Latman, P.C.

(57) ABSTRACT

In an image input apparatus, a position detecting part is arranged to detect the positions of a variator lens group and a focusing-and-compensating lens group of a photo-taking optical system, and a CPU is arranged to compute the position coordinates and direction vector of an object for a predetermined pixel of an image pickup device on the basis of focal length data, front principal point position data and rear principal point position data prestored in a ROM according to the values of the positions of the lens groups detected by the position detecting part.

18 Claims, 8 Drawing Sheets

IMAGE INPUT APPARATUS

BACKGROUND OF THE INVENTION

1. Field of the Invention

The present invention relates to an image input apparatus such as a video camera, a silver-halide camera or the like.

2. Description of Related Art

In regard to three-dimensional (3D) images, virtual realty (VR) images, computer graphics (CG) images, etc., various techniques have been developed for obtaining three-dimensional information on an external world and an object. According to these techniques, the three-dimensional information is obtained by processing an image taken in by a digital camera or a video camera.

However, since the photo-taking pattern of the camera is unknown in acquiring the three-dimensional information on an external world or an object, the three-dimensional information has been obtained by setting up simultaneous equations for the points of the external world corresponding to pixels on the surface of a CCD only on the basis of information obtained from data of a plurality of images and by solving the simultaneous equations. This method includes some ambiguity, which necessitates use of a large amount of data and an excessively long computing time for accurately obtaining information on the object. The conventional method, therefore, has been hardly practicable as it is difficult to operate a system in real time.

BRIEF SUMMARY OF THE INVENTION

The invention is directed to the solution of the above-stated problems of the prior art. It is, therefore, an object of the invention to provide an image input apparatus arranged to easily and accurately obtain information on the position of a shooting object.

It is another object of the invention to provide an image input apparatus which is arranged to be capable of easily and accurately picking up three-dimensional images.

To attain the above objects, in accordance with an aspect of the invention, there is provided an image input apparatus, which comprises lens means having a movable lens, photoelectric conversion means for converting an image of an object formed through the lens means into an electrical signal for every pixel thereof, detection means for detecting a position of the movable lens, and computation means for computing position information of the object on the basis of a value detected by the detection means.

The above and further objects and features of the invention will become apparent from the following detailed description of preferred embodiments thereof taken in conjunction with the accompanying drawings.

DETAILED DESCRIPTION OF THE INVENTION

Hereinafter, preferred embodiments of the invention will be described in detail with reference to the drawings.

Figure 1:
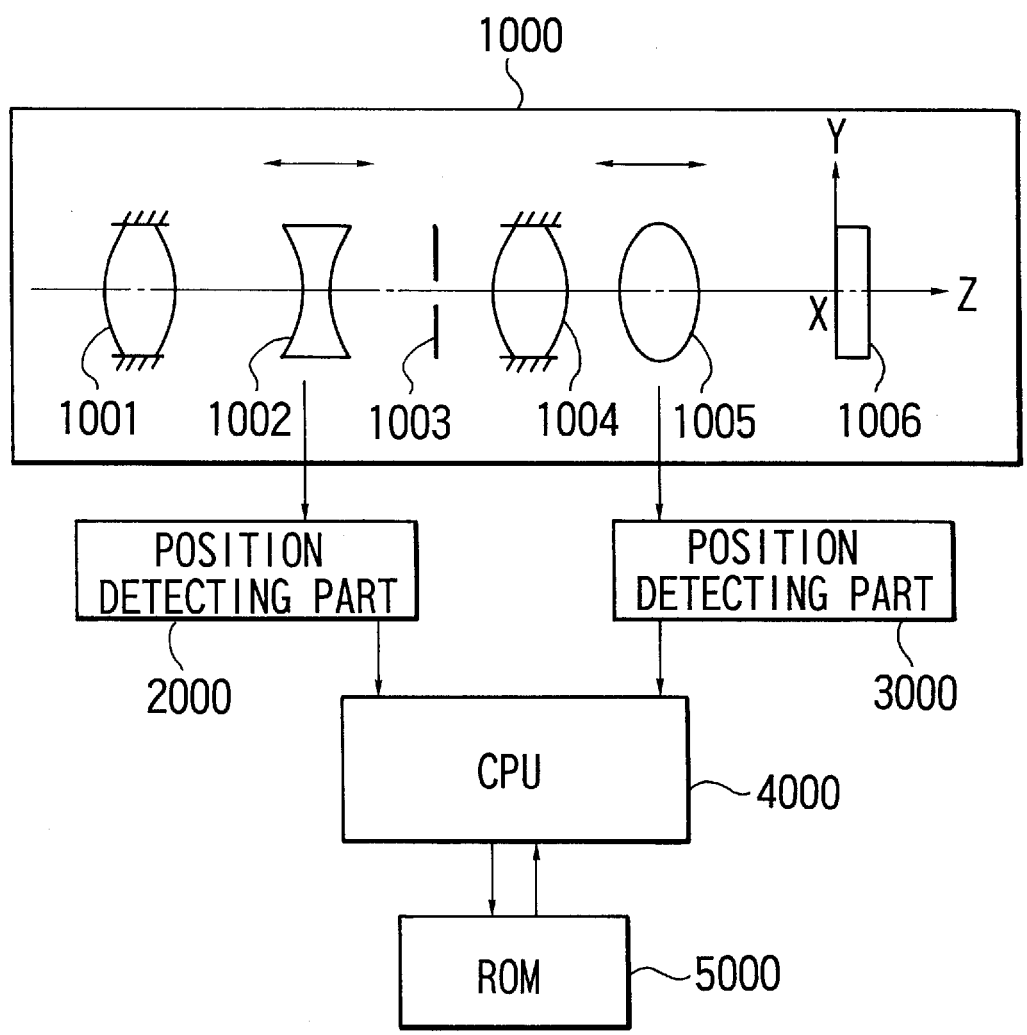
FIG. 1 is a block diagram showing an arrangement included in common in image input apparatuses according to first, second and third embodiments of the invention.

FIG. 1 shows the basic arrangement of components of an image input apparatus arranged as applicable in common to various embodiments of the invention. The image input apparatus includes a photo-taking optical system 1000. In this case, the photo-taking optical system 1000 is a four-lens-group rear-focus zoom lens system but not limited to any specific optical type. The optical system 1000 includes lens groups 1001, 1002, 1004 and 1005, each of which is composed of either a single lens or a plurality of lenses. The first and third lens groups 1001 and 1004 are fixed lens groups. The second lens group 1002 is a variator (magnification varying) lens group and is movable. The fourth lens group 1005 is a focusing-and-compensation lens group and is also movable. A diaphragm 1003 is arranged to adjust the quantity of incident light. A solid-state image pickup element 1006 is a CCD or the like and is arranged to execute a photoelectric converting action.

The second lens group 1002 and the fourth lens group 1005 are arranged to be driven by stepping motors which are not shown. However, the motors are not limited to motors of any specific types. The use of the stepping motor may be changed to use of motors of some other types including an electromagnetic motor such as a DC motor, a solid-state motor such as an ultrasonic motor, an electrostatic motor, etc.

Position detecting parts 2000 and 3000 are arranged to detect the positions of the second lens group 1002 and the fourth lens group 1005, respectively. A counter is used for each of the position detecting parts 2000 and 3000 and is arranged to detect the lens position by counting the number of driving pulses applied to the stepping motor. The position detecting parts 2000 and 3000 are not limited to any specific type. Position detecting parts of a variable resistance, capacitance type or of an optical type such as a PSD or an IRED, etc., may be employed.

A CPU 4000 controls the system. A ROM 5000 is arranged to store data. The CPU 4000 is arranged to convert the output values Vi and Bj of the position detecting parts 2000 and 3000 into predetermined discrete data I and J, to read data, such as focal length data Fij, front principal point position data Mij, rear principal point position data Uij, etc., which are prestored in the ROM 5000 and correspond to the discrete data I and J, and to obtain position coordinates Hijk and direction vectors Nijk corresponding to a predetermined pixel k of the CCD 1006 by an arithmetic operation.

Next, the above arithmetic operation is described below.

Coordinate axes X, Y and Z are set as shown in FIG. 1. The X axis extends perpendicularly from the paper surface to the reverse side of the paper of the drawing. The Y axis extends from a lower part upward in parallel with the paper surface of the drawing. The Z axis is set as an optical axis to extend from the left to the right in parallel to the paper surface of the drawing. An XY plane is set on the image forming plane of the CCD 1006. The coordinates of the pixel k on the surface of the CCD 1006 are set as (Cxk, Cyk, 0). In this instance, the coordinates of the pixel k are assumed to be located at the barycenter of the pixel plane.

Assuming that the focal length data is Fij, the coordinates of the rear focus position become (0, 0, −Fij). With the coordinates of the front principal point position assumed to be (0, 0, Mij) and the coordinates of the rear principal point position assumed to be (0, 0, Uij), the coordinates of the front focus position become (0, 0, Mij-Fij). The coordinates Hijk of the position of the shooting object are set as (Hxijk, Hyijk, Hzijk). Then, according to the formula of Newton, the coordinate values of the X, Y and Z axes of the coordinates Hijk of the position of the object can be obtained by the following formulas (1), (2) and (3):

$$Hxijk = Cxk \times Fij/(Uij+Fij) \quad (1)$$

$$Hyijk = Cyk \times Fij/(Uij+Fij) \quad (2)$$

$$Hzijk = Mij - Fij^2/(Uij+Fij) \quad (3)$$

Further, it is known that a line connecting the pixel k to the front principal point position is parallel with a line connecting the rear principal point position to the object corresponding to the pixel k. Therefore, it can be understood that the object is located on a straight line which passes the front principal point position and which is parallel with a direction vector Nijk=(−Cxk, −Cyk, Uij) in the direction from the pixel k toward the rear principal point position. This straight line can be expressed by the following formula (4):

$$x/-Cxk = y/-Cyk = (z-Mij)/Uij \quad (4)$$

The ROM 5000 is arranged to store the focal length data Fij and the front and rear principal point position data Mij and Uij corresponding to the positions of the lens groups 1002 and 1005 of the photo-taking optical system 1000. By virtue of this, the position coordinates Hijk and the direction vector Nijk of the object can be accurately obtained.

A stereoscopic image pickup system to which the image input apparatus of each of embodiments of the invention is applied is next described as follows.

Figure 2:
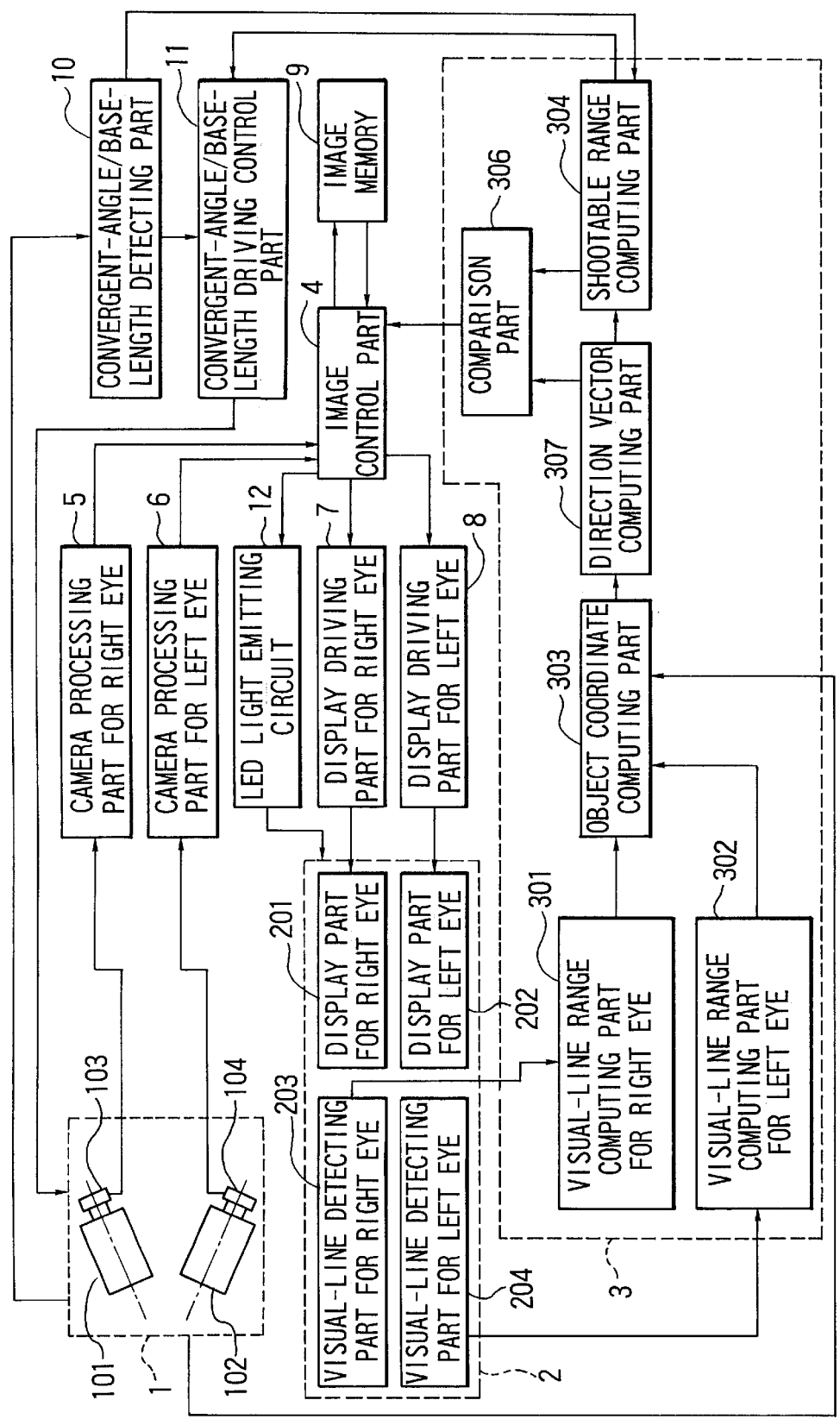
FIG. 2 is a block diagram showing the arrangement of a stereoscopic image pickup system using the image input apparatus.

FIG. 2 shows the arrangement of the stereoscopic image pickup system. Referring to FIG. 2, a stereoscopic camera 1 is arranged to take in a plurality of parallactic images. The camera 1 includes an optical system 101 and a CCD 103, serving as a photoelectric conversion element, which are arranged to take in a parallactic image for the right eye, and an optical system 102 and a CCD 105 which are arranged to take in a parallactic image for the left eye.

A pair of the optical system 101 and the CCD 103 and a pair of the optical system 102 and the CCD 104 are arranged to meet one and the same optical specifications, which are not limited to any specific specifications. Further, an interval between the pair of the optical system 101 and the CCD 103 and the pair of the optical system 102 and the CCD 104 (hereinafter referred to as the base length) and an angle made by the optical axes of the respective pairs (hereinafter referred to as the convergent angle) are variable by a mechanism (not shown) and are arranged to be under the driving control of a convergent-angle/base-length driving control part 11. In the case of FIG. 2, the photo-taking action is arranged to be carried out by having the camera optical axes intersect each other. However, the photo-taking action can be carried out by arranging the camera optical axes to be parallel with each other, instead of intersecting each other.

A convergent-angle/base-length detecting part 10 is arranged to detect the base length and the convergent angle of the stereoscopic camera 1 by means of an encoder which is not shown.

An image display part 2 includes a display part 201 for the right eye, a display part 202 for the left eye, a visual-line detecting part 203 for the right eye and a visual-line detecting part 204 for the left eye. The right-eye display part 201 and the left-eye display part 202 are of the same specifications. Each of these display parts 201 and 202 is not limited to a specific display but may be a liquid crystal display element (LCD) or a CRT having an observation optical system or a retina display which is arranged to show an image by an afterimage effect attained by illuminating and scanning a retina with a light beam from an LED or a laser.

The right-eye visual-line detecting part 203 and the left-eye visual-line detecting part 204 are arranged respectively to detect the directions of lines of sight (visual lines) of the user by using cornea reflection light. This detecting method is disclosed, for example, in Japanese Laid-Open Patent Application No. HEI 5-68188. The method usable according to the invention is, however, not limited to this particular method. The visual-line detecting parts 203 and 204 may be arranged to operate in accordance with some other method, such as an EOG method which utilizes a difference in potential of an eyeball, a method which utilizes a difference in reflection factor between the white of eye and the iris of eye on the sclera, or a search coil method whereby a contact lens having a coil buried therein is mounted under a uniform magnetic field and the motion of the eyeball is measured.

A computing part 3 is arranged to compute a shootable range according to the output values of the right-eye visual-line detecting part 203 and the left-eye visual-line detecting part 204, and includes a visual-line range computing part 301 for the right eye, a visual-line range computing part 302 for the left eye, an object coordinate computing part 303, a direction vector computing part 307, a shootable range computing part 304, and a comparison part 306. The object coordinate computing part 303 and the direction vector computing part 307 include the position detecting parts 2000 and 3000 which are provided with the counters as mentioned above, the CPU 4000 and the ROM 5000.

Reference numeral 4 denotes an image control part 4. A camera processing part 5 for the right eye and a camera processing part 6 for the left eye are arranged to process image signals from the CCD 103 and the CCD 104, respectively, into signals conforming to a predetermined image format. The image control part 4 is arranged to convert these processed signals from the camera processing parts 5 and 6 into video signals, to send the video signals to right-eye and left-eye display driving parts 7 and 8 and to exchange data with an image memory 9. The image control part 4 is further arranged to send to an LED light emitting circuit 12 control signals for control over light emission and extinction of LEDs (not shown) which are disposed respectively within the display parts 201 and 202. The image memory 9 is, in this case, a magnetic tape which is employed as a recording medium. However, the image memory 9 is not limited to the magnetic tape but may be, for example, an IC memory, a magneto-optical disk, a DVD, a CD, a PD, or the like.

The operation of a stereoscopic image pickup system according to the first embodiment of the invention is next described as follows.

Figure 3:
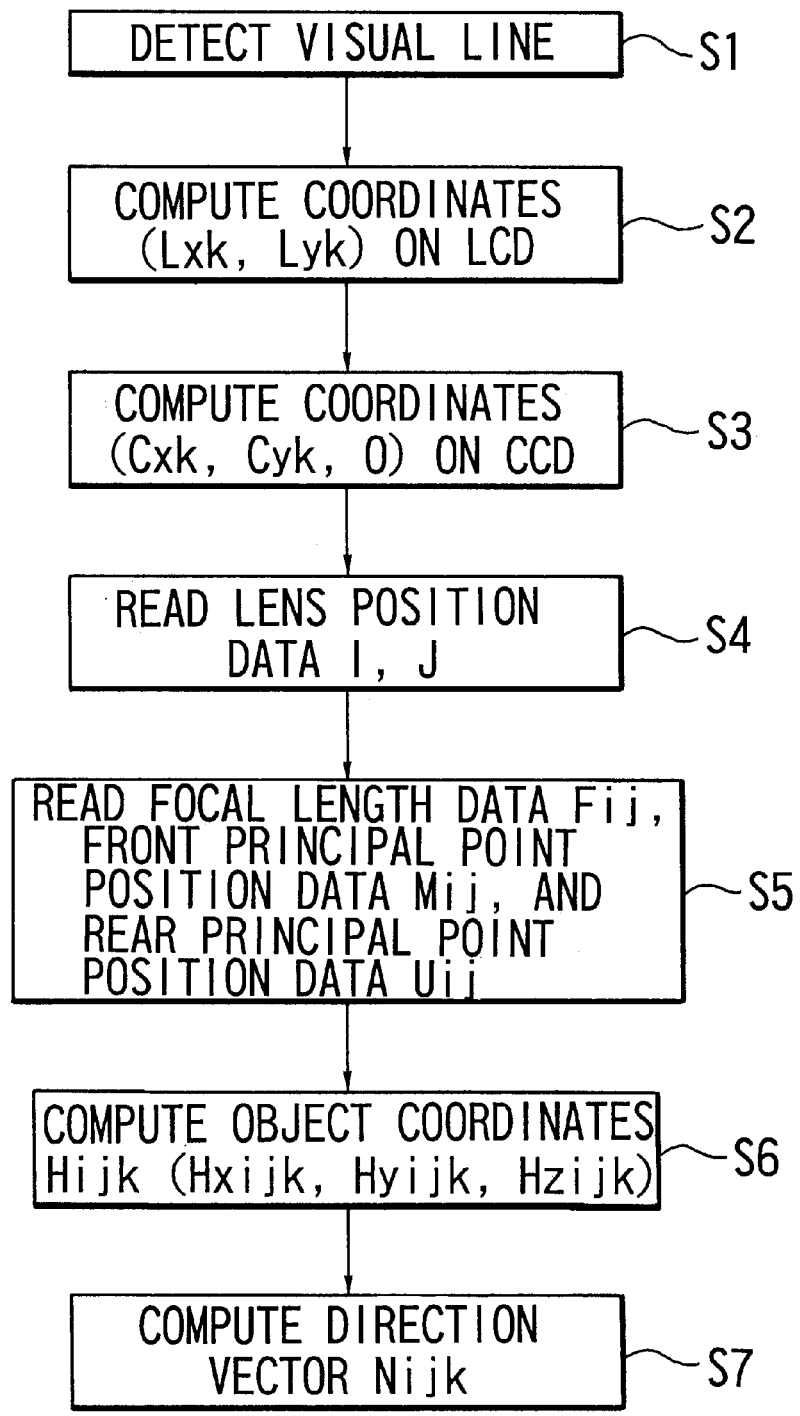
FIG. 3 is a flow chart showing the operation of a stereoscopic image pickup system according to the first embodiment of the invention.

FIG. 3 is a flow chart showing the flow of the operation from the visual-line detecting parts 203 and 204 to the computing part 3.

In FIG. 3, a step S1 corresponds to the actions of the visual-line detecting parts 203 and 204 shown in FIG. 2. Steps S2 and S3 correspond to the actions of the visual-line range computing parts 301 and 302. Steps S4, S5 and S6 correspond to the action of the object coordinate computing part 303. A step S7 corresponds to the action of the direction vector computing part 307.

At the step S1, visual lines are detected to output coordinates of cornea reflection images for the right and left eyes.

At the step S2, coordinates on the LCD display parts 201 and 202 for the left and right eyes which correspond to the above-stated coordinates obtained at the step S1 are computed.

At the step S3, coordinates on the CCDs 103 and 104 for the left and right eyes which correspond to the above-stated coordinates obtained at the step S2 are computed.

At the steps S4, S5 and S6, the focal length data Fij, the front principal point position data Mij and the rear principal point position data Uij of each of the optical systems 101 and 102 are read from the ROM according to the positions of the lens groups of the optical systems 101 and 102, as mentioned above. Then, the object coordinates Hijk (Hxijk, Hyijk, Hzijk) are computed from these data according to the above-mentioned formulas (1), (2) and (3).

At the step S7, the direction vector Nijk connecting the front principal point position (Mij) and the object position (Hijk) is computed and obtained for each of the optical systems 101 and 102 according to the above-mentioned formula (4).

The details of the shootable range computing part 304 are next described as follows.

A parallactic image is fusible by man when a parallax of the object image on a display image plane (the amount of discrepancy on an image plane) is not exceeding the pupil distance of man (about 63 mm) in the direction of depth (in the direction of depth from the display image plane) and not exceeding 20 cm in the front direction (frontward direction from the display image plane). The procedure for deciding the shootable (photographable) range by utilizing the above facts is described below with reference to FIG. 4.

Figure 4:
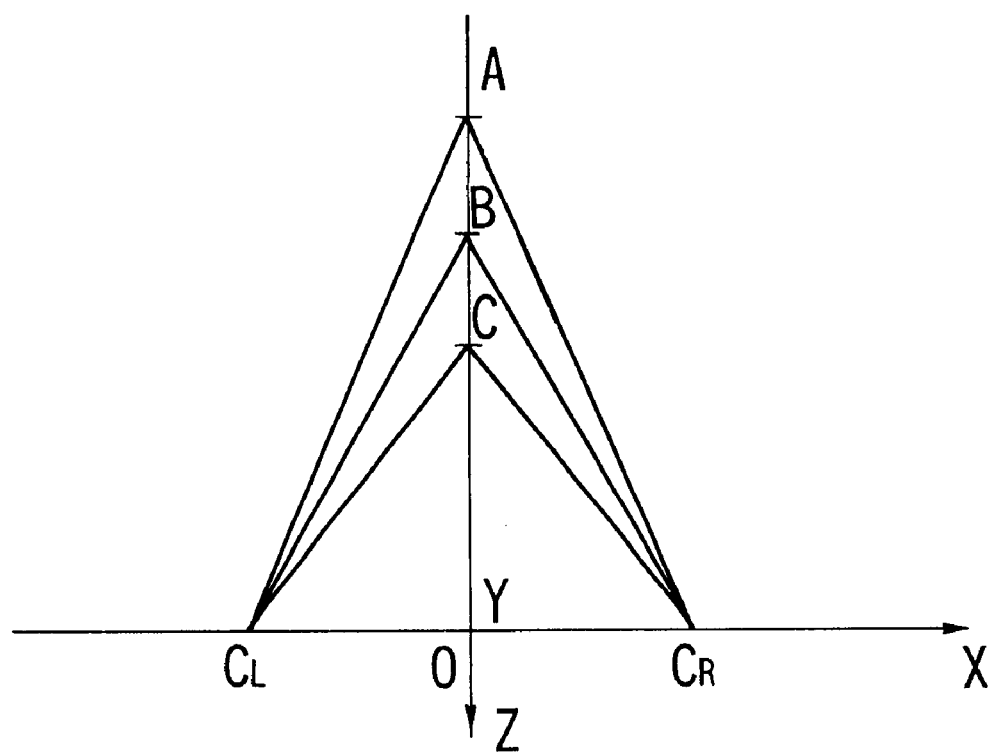
FIG. 4 is a diagram for explaining the method for computing a shootable range.

In the graph of FIG. 4, a Z axis indicates a depth direction, a Y axis indicates a vertical direction, and an X direction indicates a direction perpendicular to the depth direction. A point CL indicates the front principal point position coordinates of the left-eye optical system 102, a point CR indicates the front principal point position coordinates of the right-eye optical system 101, and a point B indicates an intersection point where the optical axes of the left-eye and right-eye optical systems 102 and 101 intersect each other. A point A is located in the direction of depth from the point B. A point C is located frontward from the point B.

In this instance, the point B corresponds to the center of the image plane of each of the left-eye and right-eye optical systems 102 and 101 and is at a position where the parallax is at "zero". In a stereoscopic image being displayed, the point B is a point located on the display image plane. The point A is then displayed as a point located in rear of the display image plane, while the point C is displayed as a point located in front of the display image plane. The points A and C are assumed to be within the angle of view ew of the lenses of the left-eye and right-eye optical systems 102 and 101. The coordinates of the point A are assumed to be (0, A), those of the point B are assumed to be (0, B), those of the point C are assumed to be (0, C), those of the point CL are assumed to be (−k, 0) and those of the point CR are assumed to be (k, 0). Further, the following relations are assumed to be obtained:

$$\angle BC_LO = \angle BC_RO = \theta b \quad (5)$$

$$\angle BC_LA = \angle B\ C_RA = \theta b \quad (6)$$

$$\angle BC_LC = \angle BC_RC = \theta b \quad (7)$$

Assuming that the horizontal length of the display image plane is 2Ws, an amount of deviation Da of the point A from the center of the image plane can be expressed by the following formula:

$$Da = Ws \times \tan(\theta a) \div \tan(\theta w) \quad (8)$$

Therefore, assuming that the pupil distance of the user is 2dh, the following formula is established:

$$dh \geq Da \quad (9)$$

Further, since $$\tan(\theta a + \theta b) = A \div k \quad (10)$$

$$\tan(\theta b) = B \div k \quad (11),$$

the following formula can be established from the above formulas (8) to (11):

$$A \leq k \times \{dh \times \tan(\theta w) + Ws \times \tan(\theta b)\} \div \{Ws - dh \times \tan(\theta b) \times \tan(\theta w)\} \quad (12)$$

An image fusible range obtained in the direction of depth when the point B is at the center of the image plane can be computed in accordance with the formula (12). In other words, in order to have the image fusible in the direction of depth from the point B, the point A must have a Z axis coordinate value smaller than a value computed by the right part of the formula (12). The values of k and θb in the formula (12) are obtained by the convergent-angle/base-length detecting part 10. The value of θw is known from lens data. The value of Ws is known from display conditions. The value of dh is predetermined and is at 63/2 mm in the case of this embodiment although the invention is not limited to this specific value.

Next, in respect to the point C, the amount of deviation Dc on the image plane of the point C can be expressed by the following formula:

$$Dc = Ws \times \tan(\theta c) \div \tan(\theta w) \quad (13)$$

Assuming that the amount of protrusion from the stereoscopic image plane is "d" and a visual range to the display image plane is "ds", the following relations are obtained:

$$Dc \leq dh \times (ds - d) \div d \quad (14)$$

$$\tan(\theta c) - k \times (B - C) \div (k^2 + B \times C) \quad (15)$$

Then, from the above, the following formulas are established:

$$C \geq k \times \{d \times Ws \times \tan(\theta b) - dh \times (ds - d) \times \tan(\theta w)\} \div \{Ws \times d + \tan(\theta b) \times dh \times (ds - d) \times \tan(\theta w)\} \quad (16)$$

An image fusible range obtained in the frontward direction when the point B is at the center of the image plane is computed according to the above formula (16). In other words, in order to have the image fusible in the direction frontward from the point B, the point C must have a Z axis coordinate value larger than a value computed by the right part of the formula (16). The values of k and θb in the formula (16) are obtained by the convergent-angle/base-length detecting part 10. The value of θw is known from lens data. The values of Ws and ds are known from display conditions. The values of dh and d are predetermined and are dh=63/2 mm and d 200 mm in the case of this embodiment although the invention is not limited to these specific values.

Figure 5:
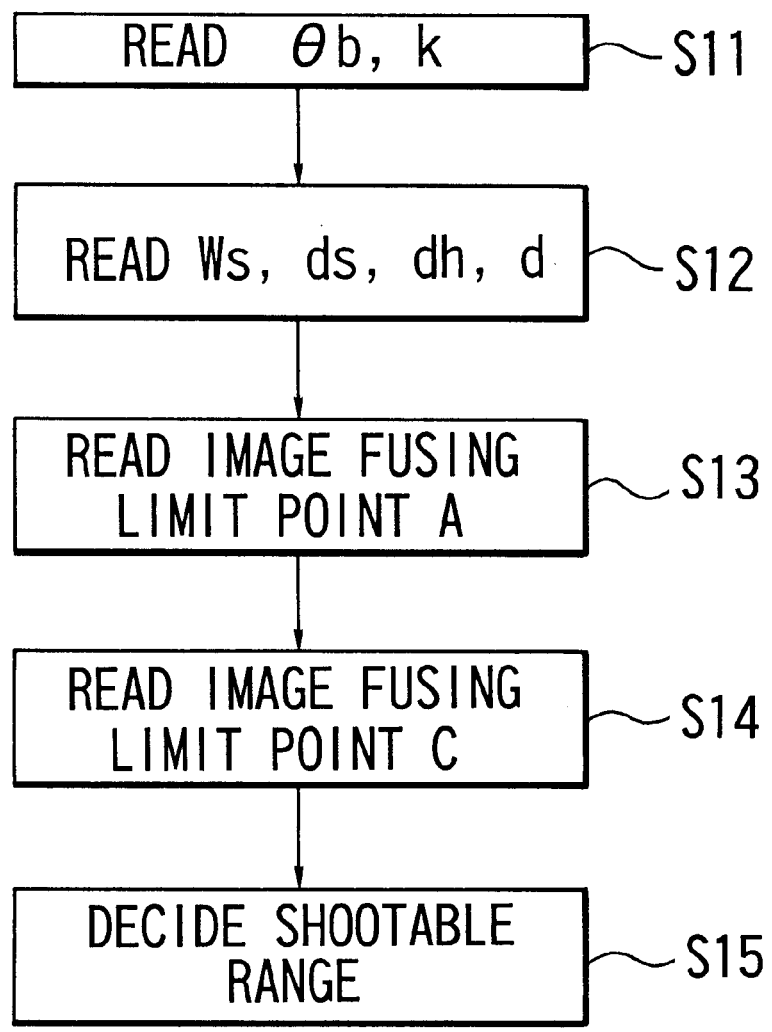
FIG. 5 is a flow chart for explaining the operation for computing a shootable range.

FIG. 5 is a flow chart showing the above-stated operations.

Referring to FIG. 5, at a step S11, the values of θb and k are read.

At a step S12, the values of Ws, ds, dh and d are read.

At a step S13, the image fusible limit point A in the direction of depth is obtained according to the formula (12).

At a step S14, the image fusible limit point C in the frontward direction is obtained according to the formula (16).

At a step S15, a shootable range is decided from the results of the steps S13 and S14, the photo-taking angle of view θw of the lenses, the base length k and the contingent angle θb.

Next, the direction vector Nijk obtained at the step S7 and the shootable range decided at the step S15 are compared with each other by the comparison part 306. In other words, the comparison is made to find if an object of shooting to which the visual line (line of sight) is currently directed is within the shootable range.

After the comparison, the image control part 4 is commanded to inform the user whether or not the object is within the shootable range. Then, either one of or both of the display parts (LEDs) 201 and 202 are caused to light up or blink according to a signal coming from the image control part 4. The display thus allows the user to know whether the object is within the shootable range or not.

The display parts 201 and 202 may be arranged either to light up when the object is within the shootable range and to be extinct when the object is not within the shootable range or to blink when the object is not within the shootable range and to be extinct when the object is within the shootable range. It is also possible to output the result of the shootable range computing operation to the display parts 201 and 202.

The timing of the sequence of the steps from S1 to S15 is not particularly limited. However, these steps may be arranged to be executed once for every 1/30sec.

Next, an image input apparatus according to the second embodiment of the invention is described below.

In the case of the second embodiment, the CPU 4000 shown in FIG. 1 is arranged to convert the output values Vi and Bj of the position detecting parts 2000 and 3000 into predetermined discrete data. The CPU 4000 then reads, according to the discrete data, the front principal point position data Mij and the rear principal point position data Uij stored in the ROM 5000 and obtains, by carrying out an arithmetic operation, the direction vector Nijk of the object corresponding to a predetermined pixel k of the CCD 1006.

The arithmetic operation is performed as follows.

Referring to FIG. 1, the front principal point position is put as (0, 0, Mij) and the rear principal point position is put as (0, 0, Uij). Then, as mentioned in the foregoing, it is known that a line connecting the pixel k to the front principal point position is parallel with a line connecting the rear principal point position to an object of shooting which corresponds to the pixel k.

Therefore, it can be understood that the object is located on a straight line which is parallel with a direction vector Nijk=(−Cxk, −Cyk, Uij) in the direction from the pixel k toward the rear principal point position. This straight line can be expressed by the formula (4) as mentioned in the foregoing.

Since, as described above, there are stored, as data, principal point positions corresponding to the positions of the lens groups of the optical system 1000, the direction vector indicative of the position of the object can be accurately obtained.

Next, an operation to be performed by the image input apparatus of the second embodiment with the image input apparatus applied to a stereoscopic image pickup system as shown in FIG. 2 is described as follows.

Figure 6:
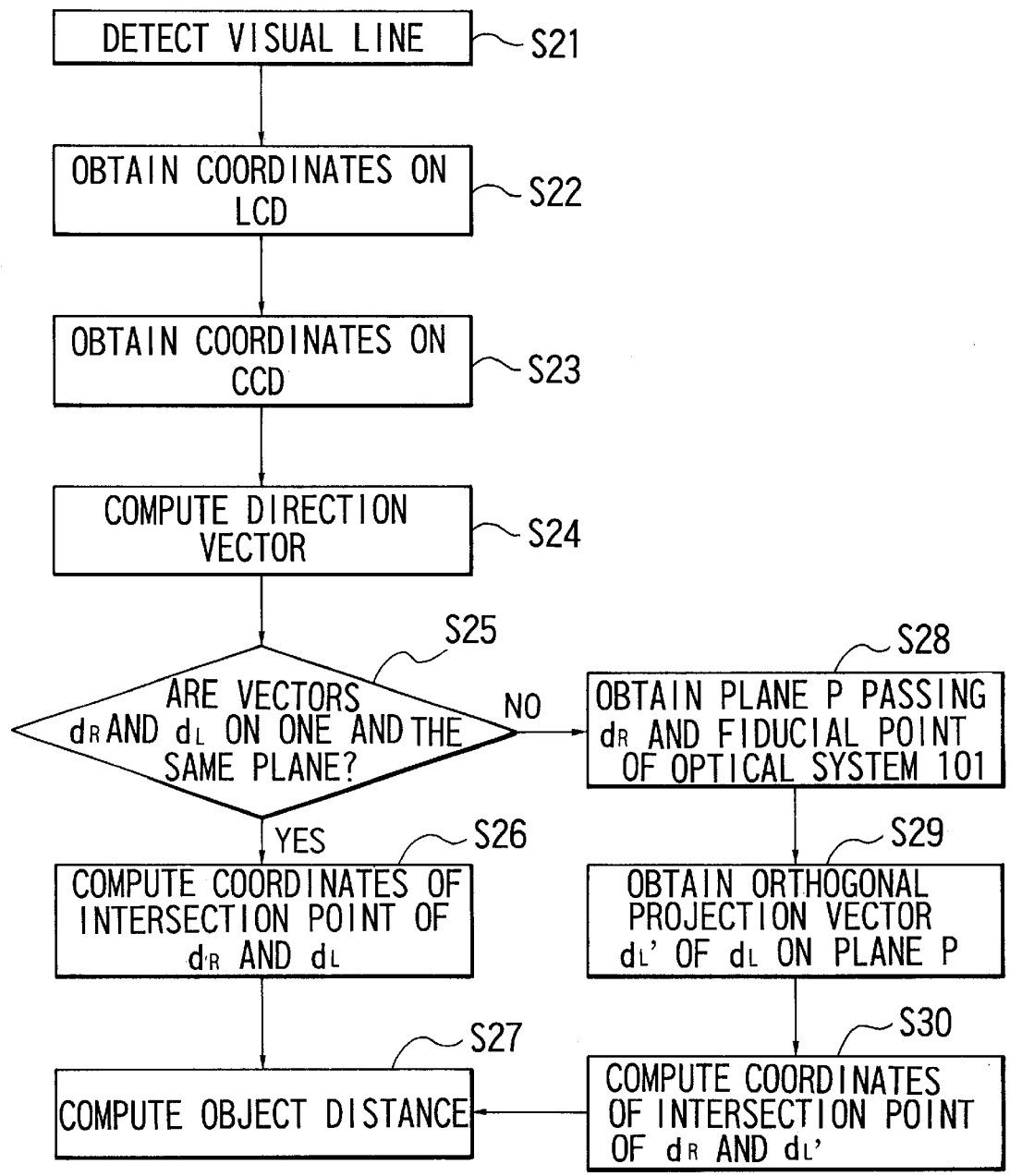
FIG. 6 is a flow chart showing the operation of a stereoscopic image pickup system according to the second embodiment of the invention.

FIG. 6 is a flow chart showing the actions of various parts of the stereoscopic image pickup system shown in FIG. 2 from the visual-line detecting parts 203 and 204 to the computing part 3.

In FIG. 6, a step S21 corresponds to the actions of the visual-line detecting parts 203 and 204 shown in FIG. 2. Steps S22 and S23 correspond to the actions of the visual-line range computing parts 301 and 302. A step S24 corresponds to the action of the object coordinate computing part 303. Steps S25, S26, S28, S29 and S30 correspond to the actions of the direction vector computing part 307. A step S27 corresponds to the action of the object coordinate computing part 303.

At the step S21, a visual-line detecting action is performed to output the coordinates of cornea reflection light of the left and right eyes.

At the step S22, coordinates on the right-eye and left-eye LCD display parts 201 and 202 corresponding to the coordinates obtained at the step S21 are obtained.

At the step S23, coordinates on the right-eye and left-eye CCDs 103 and 104 corresponding to the coordinates obtained at the step S22 are obtained.

At the step S24, as mentioned above, the front principal point position data and the rear principal point position data of the optical systems 101 and 102 are read from the ROM according to the positions of the lens groups of the optical systems 101 and 102. Then, direction vectors dR and dL, each connecting the front principal point position to the object of shooting, are obtained for the optical systems 101 and 102, respectively.

At the step S25, a check is made to find if the direction vector dR for the right eye and the direction vector dL for the left eye are within one and the same plane. If so, the flow of operation proceeds to the step S26. If not, the flow proceeds to the step S28.

At the step S26, the coordinates of a point where the right-eye direction vector dR and the left-eye direction vector dL intersect each other are obtained.

At the step S28, a plane P which passes the right-eye direction vector dR and the fiducial point of the optical system 101 is obtained.

At the step S29, an orthogonal projection vector $dL^1$ of the left-eye direction vector dL on the plane P is obtained.

At the step S30, the coordinates of a point where the right-eye direction vector dR and the orthogonal projection vector $d_L{}'$ intersect each other are obtained.

At the step S27, a distance between a predetermined fiducial point of the stereoscopic camera 1 (a midpoint between the basic coordinates of the right-eye optical system 101 and the basic coordinates of the left-eye optical system 102) and the intersection point obtained at the step S26 or S30, i.e., an object distance, is obtained.

Further, the shootable range computing part 304 is arranged to operate in the same manner as described in the foregoing with reference to FIGS. 4 and 5.

An image input apparatus according to the third embodiment is next described.

In the case of the third embodiment, in order to obtain, by arithmetic operations, the position coordinates Hijk and the direction vector Nijk of the object corresponding to a predetermined pixel k of the CCD 1006, the CPU 4000 shown in FIG. 1 converts the output values Vi and Bj of the position detecting parts 2000 and 3000 into predetermined discrete data I and J. The CPU 4000 then reads, from the ROM 5000, a pair of distortion correcting data (Dmij, Dnij) obtained from a distortion correcting data table D for the optical system 1000 corresponding to the discrete data I and J and a pixel range (m, n) including the predetermined pixel k, focal length data Fij obtained from a focal length data table F corresponding to the discrete data I and J, front principal point position data Mij and rear principal point position data Uij obtained from a principal point position data table S corresponding to the discrete data I and J.

Next, the above arithmetic operation is described.

Figure 7:
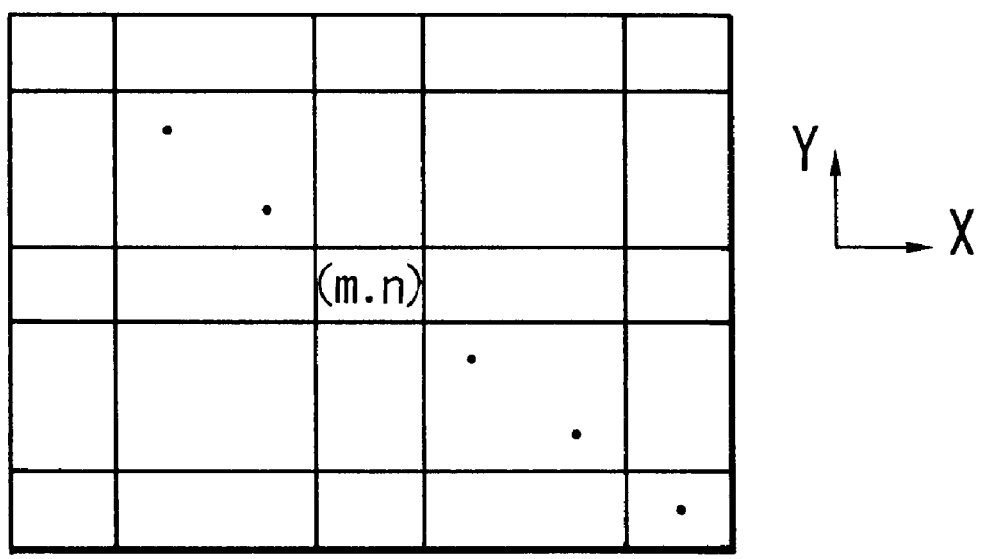
FIG. 7 is a diagram showing the surface of a CCD for explaining the operation of the image input apparatus according to the second embodiment of the invention.

Referring to FIG. 1, in obtaining the coordinates of an object of shooting, the coordinates of a pixel k on the surface of the CCD where an image of the object is formed are put as (Cmk, Cnk, 0). In this case, the coordinates of the pixel k are assumed to define the barycenter of the pixel plane thereof. Referring to FIG. 7, with the surface of the CCD divided into a predetermined number of ranges of pixels, X-axis-direction distortion correcting data and Y-axis-direction distortion correcting data which correspond to a pixel range (m, n) including the pixel k and the lens position data I and J are assumed to be Dmij and Dnij, respectively. The data Dmij and the data Dnij are put as a pair of data (Dmij, Dnij).

Generally, the optical system 1000 has some distortion as its aberrations as long as it is not an ideal lens system. In other words, an image formed on the surface of the CCD is distorted. In obtaining the position of the object from the pixel position on the CCD surface, therefore, the distortion must be corrected for accurately obtaining the object position.

In the third embodiment, as described above, there are stored the distortion correcting data corresponding to the pixels of the CCD. Accordingly, an image formed at the pixel k of the coordinates (Cmk, Cnk, 0) on the surface of the CCD is considered to be formed at coordinates (Dmij×Cmk, Dnij×Cnk, 0) if there is no distortion. In other words, the distortion correcting data mentioned here is a correction coefficient to be used for obtaining an object image forming position (C'mk, C'nk, 0) on the surface of the CCD in a case where there is no distortion, and is an intrinsic coefficient of the optical system 1000.

The data C'mk and C'nk of the image forming position are expressed as follows:

$$C'mk = Dmij \times Cmk \tag{17}$$

$$C'nk = Dnij \times Cnk \tag{18}$$

The distortion correcting data can be obtained by measuring the distortion of an actual lens or can be set on the basis of the design value of the lens. In either case, the distortion correcting data is set according to a rate of accuracy required for the system. Although the former method of obtaining the distortion correcting data excels in accuracy, the invention is not limited to the former method. Further, in the case of the third embodiment, the distortion correcting data is set for every one of divided pixel ranges by dividing the CCD pixels into a predetermined number of ranges (areas). According to the invention, however, the distortion correcting data may be set for every pixel instead of for every pixel range. In the following description, if not stated otherwise, the coordinates of the pixel k which corresponds to the object on the surface of the CCD are assumed to be (C'mk, C'nk, 0).

When a focal length corresponding to the lens position data I and J is put as Fij, the coordinates of a rear focus position become (0, 0, −Fij). When the front principal point position corresponding to the lens position data I and J is assumed to be (0, 0, Mij) and the rear principal point position corresponding to the lens position data I and J is assumed to be (0, 0, Uij), the coordinates of a front focus position become (0, 0, Mij-Fij). The coordinates Hijk of the object position is put as (Hxijk, Hyijk, Hzijk). Then, according to the formula of Newton, the coordinate values of the X, Y and Z axes of the object position coordinates Hijk can be obtained from the following formulas (19), (20) and (21):

$$Hxijk = C'mk \times Fij / (Uij + Fij) \tag{19}$$

$$Hyijk = C'nk \times Fij / (Uij + Fij) \tag{20}$$

$$Hzijk = Mij - Fij^2 / (Uij + Fij) \tag{21}$$

Further, it is known that a line connecting the pixel k to the front principal point position and a line connecting the rear principal point position to the object corresponding to the pixel k are parallel with each other. Therefore, it is apparent that the object is located on a straight line which is parallel with a direction vector Nijk=(−C'xk, −C'yk, Uij) from the pixel k toward the rear principal point position. The straight line can be expressed by the following formula (22):

$$x/-C'mk = y/-C'nk = (z-Mij)/Uij \tag{22}$$

Since, as described above, there are stored, in the ROM 5000, the focal length data Fij and the front and rear principal point position data Mij and Uij corresponding to the positions of the lens groups 1002 and 1005 of the optical system 1000, the position coordinates Hijk and the direction vector Nijk of the object can be accurately obtained.

Next, an operation to be performed by the image input apparatus of the third embodiment with the image input apparatus applied to a stereoscopic image pickup system as shown in FIG. 2 is described as follows.

Figure 8:
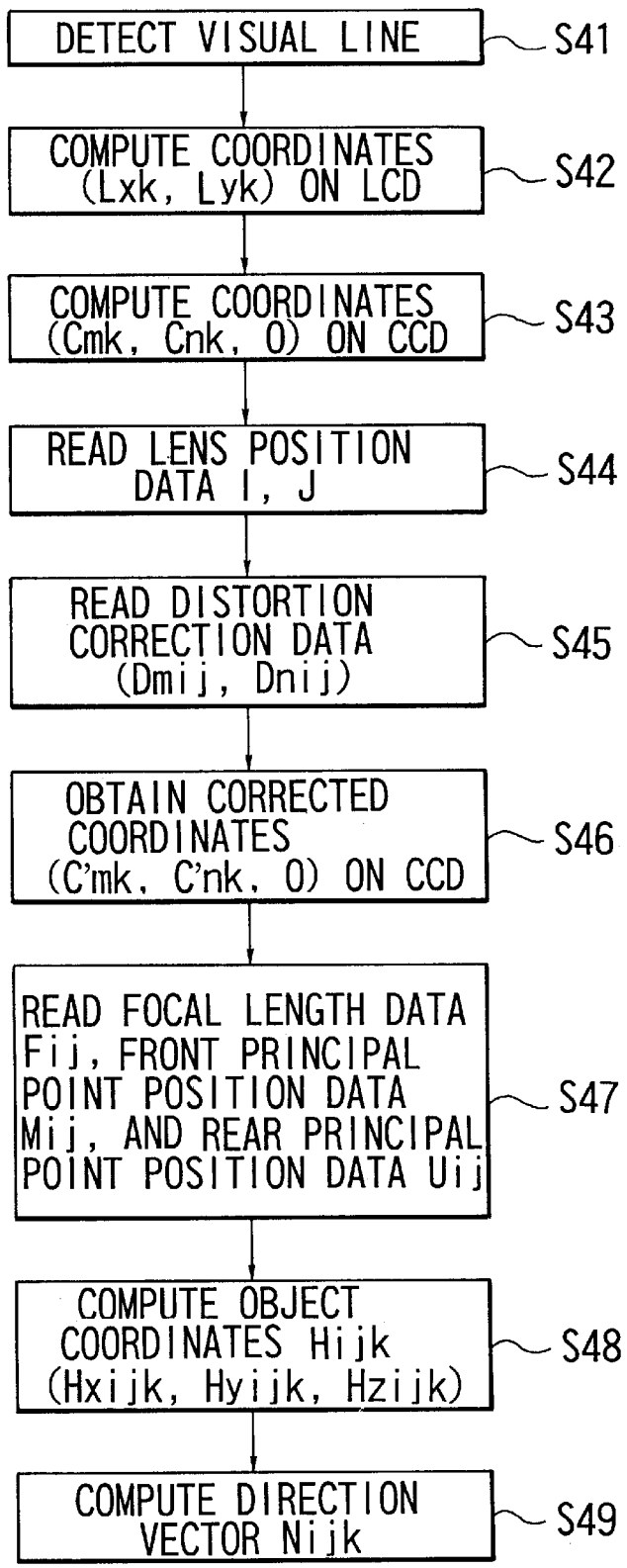
FIG. 8 is a flow chart showing the operation of a stereoscopic image pickup system arranged according to the third embodiment of the invention.

FIG. 8 is a flow chart showing the actions of parts of the stereoscopic image pickup system shown in FIG. 2 from the visual-line detecting parts 203 and 204 to the computing part 3.

In FIG. 8, a step S41 corresponds to the actions of the visual-line detecting parts 203 and 204 shown in FIG. 2. Steps S42 and S43 correspond to the actions of the visual-line range computing parts 301 and 302. Steps S44, S45, S46, S47 and S48 correspond to the actions of the object coordinate computing part 303. A step S49 corresponds to the action of the direction vector computing part 307.

At the step S41, visual lines are detected to output coordinates of cornea reflection images for the right and left eyes.

At the step S42, coordinates on the LCD display parts 201 and 202 for the left and right eyes which correspond to the above-stated coordinates obtained at the step S41 are computed.

At the step S43, coordinates on the CCDs 103 and 104 for the left and right eyes which correspond to the above-stated coordinates obtained at the step S42 are computed.

At the steps S44, S45, S46, S47 and S48, the distortion correcting data (Dmij, Dnij), the focal length data Fij, the front principal point position data Mij and the rear principal point position data Uij of each of the optical systems 101 and 102 are read from the ROM according to the positions of the lens groups of the optical systems 101 and 102, as mentioned above. Then, the object coordinates Hijk (Hxijk, Hyijk, Hzijk) are computed from these data according to the above-mentioned formulas (17) to (21).

At the step S49, the direction vector Nijk connecting the front principal point position (Mij) and the object position (Hijk) is computed and obtained for each of the optical systems 101 and 102 according to the above-mentioned formula (4).

Further, the shootable range computing part 304 is arranged to operate in the same manner as described in the foregoing with reference to FIGS. 4 and 5.

The system composed of the various function blocks shown in FIGS. 1 and 2 can be arranged either to be a hardware system or to be a microcomputer system which includes a CPU, a memory, etc. In the case of the microcomputer system, the memory is used as a storage medium arranged according to the invention. The storage medium is then arranged to store the programs for executing the processing procedures for control over the actions described in the foregoing with reference to the flow charts of FIGS. 3, 5, 6 and 8.

Further, the storage medium may be selected from among a semiconductor memory such as a ROM, RAM or the like, an optical disk, a magneto-optical disk, a magnetic medium and so on. These storage devices can be used in the forms of a CD-ROM, a floppy disk, a magnetic medium, a magnetic card, a nonvolatile memory card and the like.

Therefore, the object of the invention and its advantageous effect can be attained by having the storage medium included in a system or an apparatus other than the system shown in FIGS. 1 and 2 and by arranging the system or a computer to read the program codes stored in the storage medium and to carry out the program.

Functions and effects equivalent to those of the embodiments disclosed can be achieved to attain the object of the invention also in cases where an operating system (OS) or the like operating on a computer is arranged to carry out the disclosed processes either in part or in their entirety, or where program codes read out from a storage medium is written into a memory provided on an extended function board, or an extended function unit connected to a computer, and then the disclosed processes are carried out either in part or in their entirety by a CPU or the like provided on the extended function board or the extended function unit.

The ROM 5000 in the first or second embodiment which is arranged to store the focal length data, the front principal point position data and the rear principal point position data of the photo-taking lens, or the ROM 5000 in the third embodiment which is arranged to store the intrinsic aberration correcting data, the focal length data and the principal point position data of the photo-taking lens represents a storage medium which stores data in accordance with the invention.

The storage medium can be selected from among various storage devices similar to the above-stated storage media readable by a computer.

The image input apparatus described above is arranged to obtain information on the position of the object of shooting on the basis of information on the position of the movable lens. This arrangement enables the image input apparatus to obtain the object position information at a high rate of precision. Accordingly, when the image input apparatus is used in a stereoscopic image pickup system, whether the object is located within the shootable range or not can be detected at a high rate of precision, thereby giving a stereoscopic image easily viewable without much tiring the eyes.

Further, according to the invention, the position information of the object is arranged to be obtained on the basis of the focal length data and the front principal position data and the rear principal point position data, or on the basis of the intrinsic aberration correcting data of the lens, the focal length data and the principal point position data, according to the position information of the movable lens. That arrangement enables the image input apparatus to easily obtain accurate object position information without increasing the amount of data to be processed and the length of time required for arithmetic operations.

Further, according to the invention, when a plurality of image input apparatuses are used for a stereoscopic image pickup system, the reliability of data can be enhanced because, even if lens information of one of the plurality of image input apparatuses happens to be in trouble, the coordinates of the object can be obtained from information on the focal length and principal point position of the lens of the other apparatus.

What is claimed is:

1. A stereo image input apparatus comprising:
   lens means having a pair of movable lens;
   photoelectric conversion means for converting an image of an object formed through each of said lens means into electrical signals for every pixel thereof;
   detection means for detecting a position of each of said movable lens on an optical axis; and
   computation means for computing position information of the object in front of said image input apparatus on the basis of positions of said movable lens detected by said detection means, wherein said position information includes a vector for a predetermined pixel of said photoelectric conversion means.

2. An image input apparatus according to claim 1, wherein said position information is position coordinates and a vector of the object for a predetermined pixel of said photoelectric conversion means.

3. An image input apparatus according to claim 1, wherein said position information is computed by using position coordinates of a predetermined pixel of said photoelectric conversion means and a focal length, front principal point position coordinates and rear principal point position coordinates of said lens means corresponding to the value detected by said detection means.

4. An image input apparatus according to claim 2, wherein said position coordinates of the object are computed by using position coordinates of the predetermined pixel of said photoelectric conversion means and a focal length, front principal point position coordinates and rear principal point position coordinates of said lens means corresponding to the value detected by said detection means.

5. An image input apparatus according to claim 3 or 4 further comprising storage means for storing the focal length, the front principal point position coordinates and the rear principal point position coordinates of said lens means corresponding to the value detected by said detection means.

6. An image input apparatus according to claim 1, wherein said position information is position information of the object for a predetermined pixel of said photoelectric conversion means obtained from intrinsic aberration correcting data, focal length data and principal point position data of said lens means.

7. An image input apparatus according to claim 6, wherein the intrinsic aberration correcting data of said lens means is a data table corresponding to a predetermined pixel range of said photoelectric conversion means.

8. An image input apparatus according to claim 6, wherein the intrinsic aberration correcting data of said lens means is a data table corresponding to a predetermined pixel said photoelectric conversion means.

9. An image input apparatus according to claim 6, further comprising storage means for storing the intrinsic aberration correcting data, the focal length data and the principal point position data of said lens means.

10. An image input apparatus according to claim 1, wherein the value detected by said detection means is discrete data.

11. An image pickup system comprising a plurality of image input apparatuses each of which is an image input apparatus according to claim 1.

12. A image pickup system according to claim wherein a parallactic image for a right eye and a parallactic image for a left eye are obtained by said plurality of image input apparatuses.

13. A computer-readable storage medium which stores therein a program for executing processes comprising:

a photoelectric conversion process for converting, by using photoelectric conversion means, an image of an object formed through lens means having a pair of movable lens into electrical signals for every pixel of said photoelectric conversion means;

a detection process for detecting a position of each of said movable lens on an optical axis; and a computation process for computing position information of the object in front of said image input apparatus according to a detection positions of said movable lens obtained by said detection process, wherein said position information includes a vector for a predetermined pixel of said photoelectric conversion means.

14. A computer-readable storage medium according to claim 13, wherein said position information is position coordinates and a vector of the object for a predetermined pixel of said photoelectric conversion means.

15. A computer-readable storage medium according to claim 13, wherein said position information is computed by using position coordinates of a predetermined pixel of said photoelectric conversion means and a focal length, front principal point position coordinates and rear principal point position coordinates of said lens means corresponding to the detection value obtained by said detect ion process.

16. A computer-readable storage medium according to claim 14, wherein said position coordinates of the object are computed by using position coordinates of the predetermined pixel of said photoelectric conversion means and a focal length, front principal point position coordinates and rear principal point position coordinates of said lens means corresponding to the detection value obtained by said detection process.

17. A storage medium which stores therein focal length data, front principal point position coordinate data and rear principal point position coordinate data of lens means having a movable lens.

18. A storage medium which stores therein intrinsic aberration correcting data, focal length data and principal point position data of lens means having a movable lens.

* * * * *

UNITED STATES PATENT AND TRADEMARK OFFICE
CERTIFICATE OF CORRECTION

PATENT NO. : 6,833,858 B1
DATED : December 21, 2004
INVENTOR(S) : Shigeru Ogino

It is certified that error appears in the above-identified patent and that said Letters Patent is hereby corrected as shown below:

Column 5,
Line 48, delete "CL" and insert -- $C_L$ --.
Line 49, delete "CR" and insert -- $C_R$ --.
Line 64, delete "view ew" and insert -- view θw --.

Column 6,
Line 1, delete "CL" and insert -- $C_L$ --.
Line 2, delete "CR" and insert -- $C_R$ --.
Line 7, delete "=θb" and insert -- =θa --.
Line 9, delete "=θb" and insert -- =θc --.

Column 7,
Line 7, delete "d 200 mm" and insert -- d = 200 mm --.

Column 8,
Lines 39, 44, 45, 49, 50, 55 and 57, delete "vectors dR and dL" and insert -- vectors $d_R$ and $d_L$ --.

Column 13,
Line 15, delete "claim" and insert -- claim 11 --.
Line 30, delete "positions" and insert -- position --.

Signed and Sealed this

Fourth Day of April, 2006

JON W. DUDAS
*Director of the United States Patent and Trademark Office*